May 13, 1952     F. DE. FREMERY     2,596,537
ROTATING RADIO BEACON
Filed Feb. 11, 1947
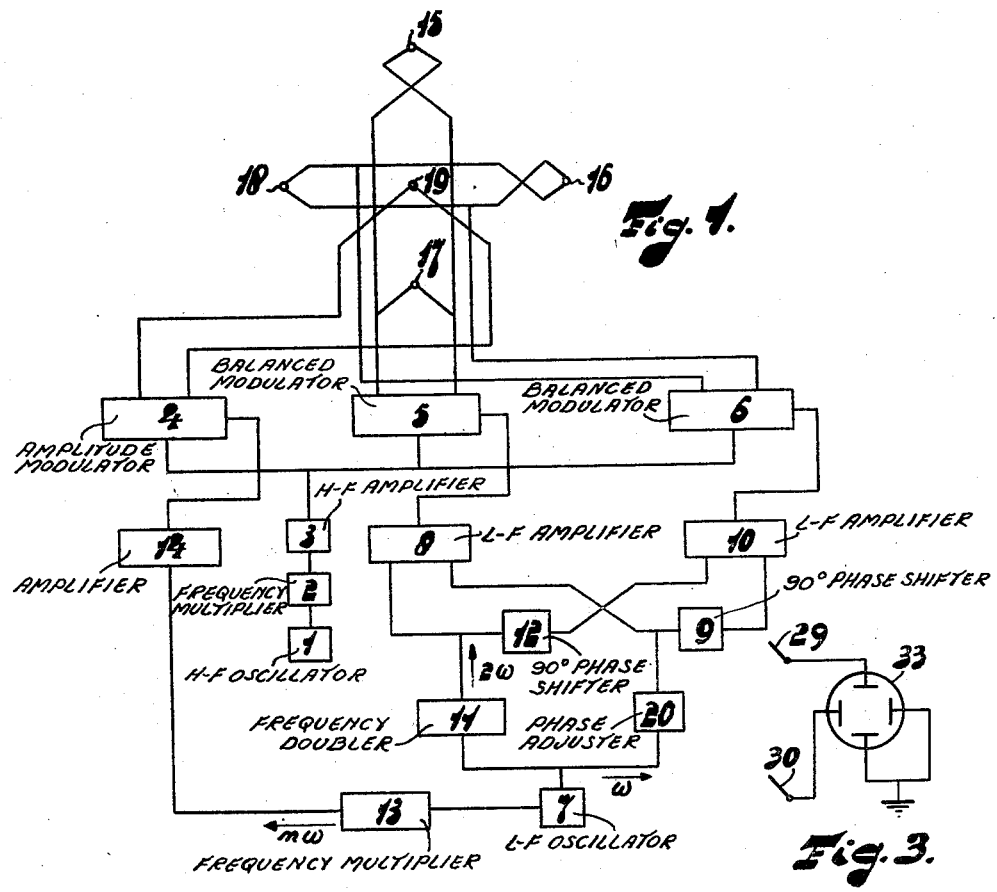
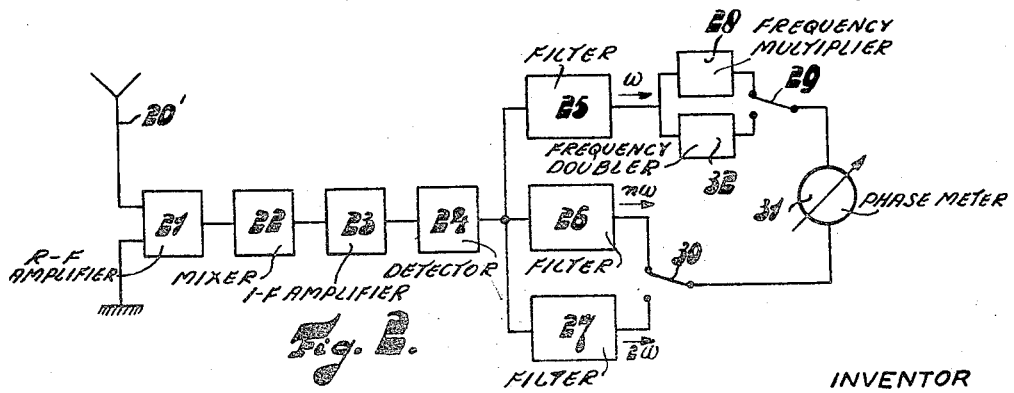
INVENTOR
FRANK DE FREMERY
BY
AGENT Patented May 13, 1952

2,596,537

UNITED STATES PATENT OFFICE 2,596,537

ROTATING RADIO BEACON

Frank de Fremery, Eindhoven, Netherlands, assignor to Hartford National Bank and Trust Company, Hartford, Conn., as trustee Application February 11, 1947, Serial No. 727,766
In the Netherlands February 5, 1944

Section 1, Public Law 690, August 8, 1946
Patent expires February 5, 1964

8 Claims. (Cl. 343—106)

The copending patent application, Serial Number 680,901, filed July 2, 1946, now U. S. Patent No. 2,530,600, issued November 21, 1950, describes a method of determining the direction in which a receiver is located with respect to a beacon transmitter by means of the angle $\beta$, enclosed by the direction to be determined and a known direction of orientation, which method consists in that a measuring characteristic, which is a measure of the angle $\beta$, is derived from the mutual location of two oscillations which have different frequencies $\omega$ and $n\omega$ and which are in harmonic relation to each other, said oscillations being produced in such a manner that the oscillation of the lower frequency has a phase corresponding to the angle $\beta$ and the other oscillation has a phase independent of the angle $\beta$.

If $n$ is greater than one, this method permits of determining the angle $\beta$ with very great accuracy, since a measuring characteristic, which is a function of $n\beta$, may be derived from the mutual location of the two oscillations $\omega$ and $n\omega$.

In fact, if the two oscillations $\omega$ and $n\omega$ are so transmitted that in the direction of orientation the two oscillations $\omega$ and $n\omega$ pass at least once simultaneously through zero in each period of the oscillation of the lower frequency, two oscillations are obtained in an arbitrary direction enclosing an angle $\beta$ with the direction of orientation, of which one is proportional to $\sin(\omega t \pm \beta)$ and the other proportional to $\sin n\omega t$. The angle $\beta$ to be determined may be derived from the two oscillations in different manners, for example by that the oscillation of the lower frequency obtained after detection is multiplied $n$ times in frequency, resulting in an oscillation which is proportional to $\sin(n\omega t \pm n\beta)$. By determining the phase angle which exists between the oscillation multiplied in frequency and the oscillation of the higher frequency obtained after detection, which is proportional to $\sin n\omega t$, there is obtained a measuring characteristic which is determined by $n\beta$, so that a higher accuracy in measurement is attained.

However, in the space surrounding the beacon device there are formed $n$-sectors in which the measured angle $n\beta$ varies each time of from 0 to $2\pi$ radials, so that the measuring characteristic obtained indicates only the possible location of the direction to be determined in one of these sectors, the spatial angle thus not being determined unambiguously by the measured value in question.

According to the invention, in order that in those cases in which the ambiguity of the measuring characteristic may lead to disturbances, this ambiguity may be eliminated, a third oscillation having a frequency which is in harmonic relation with at least one of the oscillations $\omega$ and $n\omega$ is transmitted in such a manner that the mutual location of the third oscillation and of the oscillation having the frequency $\omega$ or $n\omega$, which is in harmonic relation thereto, may have derived from it a measuring characteristic which is an unambiguous measure of the angle $\beta$.

Preferably, the frequency of the third oscillation will be half, or twice, or a higher harmonic of the oscillation having the lower or the higher frequency, the phase of the third oscillation varying with direction in the same sense as that of the oscillation having the frequency $\omega$ or $n\omega$.

Another example of the method according to the invention consists in that the frequency of the third oscillation is an underharmonic of the oscillation having the lower frequency ($\omega$), the phase of the third oscillation being independent of direction.

When using the method according to the invention two indications for the direction to be determined are obtained, of which one is ambiguous and proportional to $n\beta$ and the other determines the angle $\beta$ unambiguously. The direction to be determined is unambiguously fixed by these two indications, which indicate respectively the exact location of the direction to be determined in a definite sector and the spatial sector concerned.

A particular advantage of the method according to the invention consists in that the object aimed at can be attained with a minimum of additional means in the beacon transmitter and the receiver. This more particularly applies to those cases wherein the third oscillation is transmitted modulated on a carrier wave of the same frequency as the oscillations $\omega$ and $n\omega$, as is preferably the case.

The mutual location of the third oscillation and the two other oscillations is preferably such that these oscillations pass at least once simultaneously through zero in each period of the oscillation having the frequency $\omega$. By this adjustment it is ensured that the two indications $\beta$ and $n\beta$ have a common direction of orientation.

In order that the invention may be clearly understood and readily carried into effect, it will now be described more fully with reference to the accompanying drawing.

In the drawing:

Fig. 1 is a block diagram of a beacon transmitter in accordance with the invention, Fig. 2 is a block diagram of a beacon receiver in accordance with the invention, and Fig. 3 is a modification of Fig. 2.

Figure 1 shows diagrammatically a form of construction of a beacon device adapted for use of the method according to the invention. In this beacon device high-frequency oscillations are produced by an oscillator 1, which are supplied, if desired through a frequency-multiplier 2 and a high-frequency amplifier 3, to a modulator 4 and two push-pull modulators 5 and 6, in which push-pull modulators the high-frequency oscillations are modulated with suppression of the carrier wave by two oscillations having frequencies $\omega$ and $2\omega$ which are in harmonic relation to each other. The modulating oscillation having the frequency $\omega$ is produced by means of an oscillator 7 and is supplied, on the one hand, to the modulator 5 via an amplifier 8 and, on the other hand, to the push-pull modulator 6 via a phase-displacing device 9, bringing about a phase-displacement of 90°, and an amplifier 10. The modulating oscillation having the frequency $2\omega$ is derived from the oscillations produced by the oscillator 7 by means of a frequency doubler 11 and is supplied on the one hand to the modulator 5 via the low-frequency amplifier 8 and on the other hand, to the modulator 6 via a phase-displacing device 12 and the low-frequency amplifier 10. A modulating oscillation having the frequency $n\omega$ is derived from the oscillations produced by the oscillator 7 by means of a frequency-multiplier 13 and supplied, via an amplifier 14, to the modulator 4 and in this modulator, modulated on the high-frequency oscillations supplied to it.

Furthermore, the beacon device shown in Figure 1, comprises four vertical dipole-aerials 15, 16, 17 and 18 which are placed in the corner points of a square and which are normal to the plane of drawing, an aerial 19 being arranged in the centre of the square and in parallel to the other aerials.

The oscillations produced in the output circuit of the modulator 4 are supplied to the central aerial 19, whereas the oscillations produced in the output circuits of the modulators 5 and 6 are supplied in anti-phase to the aerials 15, 17 and 16, 18 respectively, located in the diagonal points of the square.

Consequently, in the device described the aerials placed in the corner points of the square are so fed that the phase displacements between the modulation of the modulated oscillations supplied to each pair of adjacent aerials is equal to the spatial angle of 90° which exists between the two aerials. Thus, a high-frequency field modulated by the oscillations $\omega$ and $2\omega$ is so radiated that the phase of each of the oscillations obtained after detection is dependent on direction.

The phase-displacing devices 9 and 12 are so adjusted that the current in the aerial 18 is leading and lagging respectively for the two oscillations $\omega$ and $2\omega$ with respect to that in the other aerials, due to which the phases of the modulations $\omega$ and $2\omega$ vary with directions in the same sense.

The high-frequency field modulated by the oscillation having the frequency $n\omega$ and radiated by the aerial 19 is such that the phase of the oscillation obtained after detection is independent of direction.

By means of phase-displacing device 29 it can be ensured that the mutual location of the three oscillations, $\omega$, $n\omega$ and $2\omega$ obtained after detection is fixed in a definite direction (direction of orientation) and is preferably such that the three oscillations pass at least once simultaneously through zero in each period of the oscillation having the lower frequency. In an arbitrary direction enclosing an angle $\beta$ with the direction of orientation three oscillations are thus obtained after detection, of which one is proportional to $\sin(\omega t+\beta)$, the second proportional to $\sin n\omega t$ and the third proportional to $\sin(2\omega t-\beta)$.

According to the invention, the angle to be determined may be derived from the oscillations $\sin(\omega t-\beta)$ and $\sin n\omega t$ as well as from the oscillations $\sin(\omega t-\beta)$ and $\sin(2\omega t-\beta)$.

As described in the above-identified copending application, the angle to be determined may be derived from the oscillations $\sin(\omega t-\beta)$ and $\sin n\omega t$ by that the oscillation of the lower frequency obtained after detection is multiplied $n$ times in frequency, resulting in an oscillation which is proportional to $\sin(n\omega t-n\beta)$. By determining the phase angle which exists between the oscillation multiplied in frequency and the oscillation of the higher frequency obtained after detection, which is proportional to $\sin n\omega t$, there is obtained a measuring characteristic which is determined by $n\beta$.

Similarly, oscillations proportional to $\sin(\omega t-\beta)$ and $\sin(2\omega t-\beta)$ may have derived from a measuring characteristic which is determined by $(n-1)\beta=\beta$, since in this case $n=2$.

Consequently, by means of a small extension of the transmitting equipment, i. e. by the arrangement of the devices 11 and 12, the ambiguity of the exact indication obtained by the transmission of the oscillations $\omega$ and $n\omega$ is completely obviated which appreciably increases the usefullness of the method described in the main application.

A constructional example of the device adapted to the reception of the oscillations emitted by the device of Figure 1 is shown in Figure 2. In this device the modulated oscillations received in an aerial 20 are supplied to a high-frequency amplifier 21, which is connected in cascade to a mixing stage 22, an intermediate-frequency amplifier 23, and a detector 24. The output circuit of the detector includes three filters 25, 26 and 27, which are tuned respectively to the frequencies $\omega$, $n\omega$ and $2\omega$.

To derive the angle $\beta$ from the oscillations $\omega$ and $n\omega$, the oscillation of the lower frequency is supplied via a frequency multiplier 28 and a switch 29 and the oscillation having a frequency $n\omega$ is supplied via a switch 30 to a phase-meter 31, which determines the phase angle $n\beta$ which exists between the oscillation of the lower frequency multiplied $n$ times in frequency, and the oscillations of the same frequency $n\omega$. In the other position of the switches 29 and 30 the oscillation having the frequency $\omega$ is supplied via a frequency doubler 32 and the oscillation having the frequency $2\omega$ is supplied directly to the phase meter 31. In this position the phase angle which exists between the oscillations supplied to the phase meter is equal to $\beta$ by which the direction to be determined is fixed unambiguously.

It is evident that for deriving a measuring characteristic which is proportional to $n\beta$ and $\beta$ respectively from the mutual location of the oscillations of the frequencies $\omega$ and $n\omega$, and $\omega$ and $2\omega$ respectively, obtained in the receiver after detection, use may alternatively be made of a device different from that shown in Figure 2. For example, as shown in Fig. 3, use may be made of a cathode-ray tube 33 having two deflecting devices arranged at right angles to each other, which have supplied to them the oscillations $\omega$ and $n\omega$ and $\omega$ and $2\omega$ respectively which occur in the output circuit of the detector 24.

The receiving device described can be used not only for the reception of oscillations emitted by the device of Figure 1, but is on principle adapted to the reception of any beacon devices which are applicable in the method according to the invention. In this case it is only necessary for the filters included in the output circuit of the detector 24 to be tuned respectively to the three oscillations emitted by the beacon transmitter.

In a receiving device according to the invention use is preferably made of an automatic volume control or of a limiter, in order to obtain an indication independent of the amplitude of the oscillations $\omega$, $n\omega$ and $2\omega$.

What I claim is:

1. In a radio beacon, a transmitter comprising means for propagating in space a suppressed carrier wave with a first modulation component having a space-phase depending on bearing, means for propagating in space a carrier wave with a second modulation component having a space-phase independent of bearing, the frequency of said second modulation component being a harmonic of the first modulation component, and means further imposing on said suppressed carrier wave a third modulation component having a space-phase depending on bearing, the frequencies of said first and third components being harmonically related.

2. A transmitter, as defined in claim 1, wherein the frequency of said third component is one half the frequency of said first component.

3. A transmitter, as defined in claim 1, wherein the frequency of said third component is twice the frequency of said first component.

4. In a radio beacon, a transmitter comprising a carrier wave source, first, second and third oscillatory modulation sources, the frequency of the second modulation being a multiple greater than two of the frequency of the first modulation, the frequency of the third modulation being twice the frequency of the first modulation, a pair of balanced modulators, means to apply said first and third modulations in phase quadrature as an input to said balanced modulators, means to apply said carrier wave as an input to said balanced modulators to combine with the modulations therein, said carrier wave being suppressed in said balanced modulators, an amplitude modulator, means to apply said carrier wave and said second modulation as an input to said amplitude modulator, first antenna means coupled to the output of said amplitude modulator for radiating said carrier wave with said second modulation omnidirectionally, and second antenna means coupled to the output of said balanced modulators and disposed in predetermined relation to said first antenna means for radiating a rotating field constituted by said suppressed carrier wave with said first and third modulations, the space-phase of said modulations being a function of bearing.

5. An arrangement, as set forth in claim 4, wherein said second antenna means includes four radiating elements positioned at the corners of a square, one of the balanced modulators being coupled to one pair of diagonally opposed elements for energizing said elements in opposite phase, the other of the balanced modulators being coupled to the other pair of diagonally opposed elements for energizing said elements in opposite phase.

6. In a radio beacon system, a transmitter comprising a carrier wave source, an oscillatory modulation source, a pair of balanced modulators, an amplitude modulator, means to apply said carrier wave as an input both to said amplitude modulator and said balanced modulators, means to apply the original modulation of said modulation source in phase quadrature as an input to said balanced modulators, a frequency doubler coupled to said modulation source, means to apply the doubled modulation from said doubler in phase quadrature to said balanced modulators, said balanced modulators being arranged to suppress said carrier wave, a frequency multiplier coupled to said modulation source, means to apply said multiplied modulation as an input to said amplitude modulator, first antenna means coupled to the output of said amplitude modulator for radiating said carrier wave with said multiplied modulation omnidirectionally, and second antenna means coupled to said balanced modulators and disposed in predetermined relation to said first antenna means for radiating a rotating field constituted by the suppressed carrier wave with said original modulation and said doubled modulation.

7. A transmitter, as defined in claim 6, further including an adjustable phase shifter interposed between said modulation source and said balanced modulators for effecting a predetermined phase relation between said original modulation and said doubled and multiplied modulations.

8. In a radio beacon system wherein a carrier wave with first and third modulation components is radiation and a carrier wave with a second modulation component is radiated, the frequency of said third component being double the frequency of said first component, the frequency of said second component being a multiple greater than two of said first component, said first and third components having a space-phase depending on bearing and said second component having a space-phase independent of bearing, a receiver for said waves comprising means to detect and demodulate said waves to derive said components therefrom, filter means coupled to said demodulation means to separate said demodulated components, means to double the frequency of the separated first component, means to multiply the separated first component and phase indicating means to compare said multiplied first component with said second component and to compare said doubled first component with said third component to determine the bearing.

FRANK DE FREMERY.

REFERENCES CITED

The following references are of record in the file of this patent:

UNITED STATES PATENTS

| Number | Name | Date |
|---|---|---|
| 1,922,677 | Greig et al. | Aug. 15, 1933 |
| 2,252,699 | Byrne | Aug. 19, 1941 |
| 2,253,958 | Luck | Aug. 26, 1941 |
| 2,394,157 | Earp | Feb. 5, 1946 |
| 2,422,110 | Luck | June 10, 1947 |

FOREIGN PATENTS

| Number | Country | Date |
|---|---|---|
| 385,521 | Great Britain | Dec. 29, 1932 |